United States Patent [19]

Naga et al.

[11] Patent Number: 5,569,482
[45] Date of Patent: Oct. 29, 1996

[54] PROCESS FOR PRODUCING EDIBLE PROTEINACEOUS FILM

[75] Inventors: Mitsuo Naga; Shuitsu Kirihara; Yoshinori Tokugawa; Fumiaki Tsuda, all of Hiroshima; Toshiaki Saito, Sakai; Motohiko Hirotsuka, Kaizuka, all of Japan

[73] Assignee: Fuji Oil Company, Limited, Osaka-fu, Japan

[21] Appl. No.: 313,879

[22] Filed: Sep. 28, 1994

[30] Foreign Application Priority Data

Oct. 1, 1993 [JP] Japan .................. 5-246822

[51] Int. Cl.⁶ ........................................ A23J 1/00
[52] U.S. Cl. .................. 426/656; 426/516; 426/517
[58] Field of Search ........................... 426/656, 634, 426/516, 517

[56] References Cited

U.S. PATENT DOCUMENTS 2,816,837 12/1957 Holsman .................... 99/171
3,615,715 10/1971 Mullen ..................... 99/176
3,751,202 8/1973 Coleman et al. ............ 425/133
4,861,603 8/1989 Saito et al. ............... 426/93

OTHER PUBLICATIONS

Patent Abstracts Of Japan, vol. 15, No. 332, Aug. 23, 1991 [Yoshinori et al. JP-A-03 127 945].

*Primary Examiner*—Anthony J. Weier
*Attorney, Agent, or Firm*—Wenderoth, Lind & Ponack

[57] ABSTRACT

A process for producing an edible proteinaceous film entails kneading and melting a raw material containing water and protein with heating by an extruder, extruding the melted material through a die in an extruder to form a tubular extrudate, providing a gas at a pressure above atmospheric pressure to the interior of the tubular extrudate while exhausting the gas, and holding and receiving the tubular extrudate with a take-off means. An apparatus for use with the method affords edible films. The apparatus and process are particularly advantageous for forming edible films from various sources of soybean protein.

9 Claims, 2 Drawing Sheets

PROCESS FOR PRODUCING EDIBLE PROTEINACEOUS FILM

FIELD OF THE INVENTION

The present invention relates to a process for producing an edible proteinaceous film and an apparatus therefor. More specifically, it relates to novel improvement in the production of tubular edible casings by using a raw material containing water and protein.

BACKGROUND OF THE INVENTION

Usually, casings for food are classified into natural and artificial casings. Natural casings are produced from the intestines of domestic animals such as sheep, swine, cattle and the like. On the other hand, artificial casings include edible casings (collagen proteins) and non-edible casings (cellulose, plastics).

Since the present invention is directed to edible casings, conventional processes for producing them are described below.

Natural casings are produced by removing the intestines from an animal, removing feculence and mucosa therefrom by washing with water and salting.

As for edible casings (collagen proteins), it was reported that Karl Freudenberg Co. in Germany first succeeded in the production of a thick artificial casing material by using collagen fibers of the cattle skin in the middle of 1920's and Becker Co. marketed this material under the trade name of "Naturin Casing". Such casings have been produced and sold by several companies in different countries. Among them, a typical process is described below.

According to this process, the dermis of an adult cow is soaked in lime, followed by deliming, pulverizing mechanically and disentangling after being swollen well with an acid to prepare a collagen fiber paste. On the other hand, the purified cattle dermis is subjected to enzymatic decomposition with a proteolytic enzyme, "Procuase" (Meiji Seika Co., Ltd.), to prepare an enzymatically digested collagen. Eighty parts of the collagen fiber paste previously prepared is mixed with 20 parts of the enzymatically digested collagen, and the mixture is extruded into a saturated saline solution to form a molded material by coagulation. After coagulation, the molded material is tanned, washed with water, soaked in glycerin bath, and dried. After drying, the material is folded in bellows, heated for several hours (below 100° C.) and allowed to stand in a constant humidity to obtain a casing.

As described above, in the production of a conventional tubular edible casing, a coagulant has been always used and no proteinaceous film which is an edible tubular casing produced from soybean protein has been produced heretofore in the prior art.

Conventional natural casings and edible casings have the following problems:

As for natural casings, it is difficult to remove feculence and mucosa from the animal intestines by washing. Moreover, there have been problems in quality such as pinholes and different size.

As for edible casings, the preparation of a paste from collagen fibers in the pretreatment for extrusion from a rotary nozzle into a saturated saline solution is complicated and requires much labor and time with low productivity. In addition, the raw materials are expensive.

OBJECTS OF THE INVENTION

The main object of the present invention is to solve the above problems in conventional casings and edible casings. In particular, the present invention provides a process for producing an edible proteinaceous film for preparing tubular edible casings by using a raw material containing water and protein, and an apparatus therefor.

This object and other objects and advantages of the present invention will become apparent to a person skilled in the art from the following description with reference to the accompanying drawings.

SUMMARY OF THE INVENTION

Figure 1:
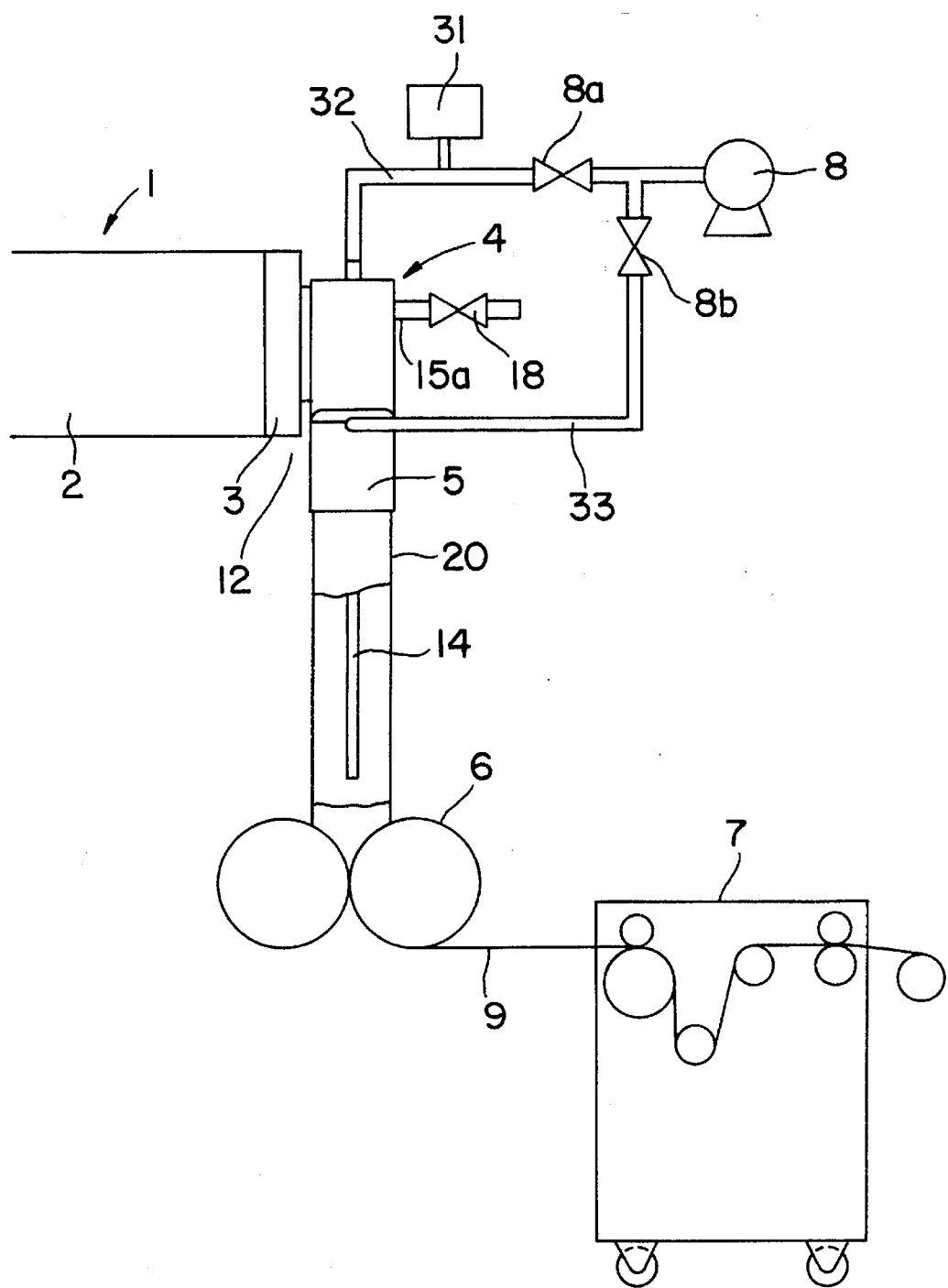
FIG. 1 is a schematic diagram showing an example of the apparatus for producing the edible proteinaceous film of the present invention including an extruder and circumferential devices.

According to the present invention, there is provided a process for producing an edible proteinaceous film which comprises kneading and melting a raw material containing water and protein with heating by an extruder (1), extruding the melted material through a die (4) having a circular opening (16) of the extruder, while providing gas of a higher pressure than the atmospheric pressure into the inside of a tubular extrudate (20) and exhausting the gas, and then taking off the tubular extrudate (20) by holding with a take-off means (6).

The present invention also provides an apparatus for producing an edible proteinaceous film which comprises an extruder (1), a die (4) having a circular opening (16) connected to the front end part of the extruder, a take-off means for taking off a tubular extrudate (20) extruded from the extruder which is provided downstream of the circular opening (16) and apart from the circular opening, and a gas feeder (8) connected to the die (4);

said die (4) having a gas feeding pipe (14) and a gas exhausting pathway (15) at the inside of the circular opening (16) with respect to the radial direction, and a cooling jacket (17) at the outer periphery of the circular opening;

said gas feeding pipe (14) and said cooling jacket (17) being connected to said gas feeder (8) by pipings (32, 33) to which flow rate controllers (8a, 8b) are provided;

said gas exhausting pathway (15) having an outflow rate controller; and said gas feeding pipe (14) being projected from the end of the circular opening (16).

DETAILED DESCRIPTION OF THE INVENTION

According to the process for producing an edible proteinaceous film of the present invention, a raw material containing water and protein is kneaded and melted by an extruder with heating and extruded from a die having a circular opening of the extruder to form a tubular extrudate. The extrudate is taken up (received) by holding with a take-off means. In the present invention, gas of a higher pressure than the outside atmospheric pressure is provided to the inside of the tubular extrudate after extruding from the circular opening and before taking off.

More specifically, the protein in the raw material is a soybean protein. The content of crude protein is more than 60% by weight based on the solid matter thereof. Preferably, the protein in the raw material is composed of one or more proteins selected from a water extract of soybean, a water extract of defatted soybean, condensed soybean protein, isolated soybean protein and 11S isolated soybean protein.

The raw material contains 40 to 150% by weight, preferably 60 to 100% by weight of water, 0 to 100% by weight, preferably 40 to 80% by weight of a plasticizer or a wetting agent (e.g., edible polyhydric alcohols such as glycerol, sorbitol, mannitol, propylene glycol, etc.), 0 to 60% by weight, preferably 5 to 30% by weight of saccharides (e.g., glucose, sucrose, dextrin, starch, etc.) and 0 to 60% by weight, preferably 5 to 30% by weight of fats and oils (e.g., vegetable oils such as soybean oil, rapeseed oil, palm oil, corn oil, cottonseed oil, coconut oil, palm kernel oil, rice oil, safflower oil, high oleic safflower oil, sunflower oil, high oleic sunflower oil, etc., animal oils such as head, lard, fish oil, whale oil, milk fat, etc., their fractionated, hydrogenated, transesterified oils and a mixture thereof) based on the weight of the crude protein.

When the water content of the raw material is lower than the above range, plasticity of the material is too low, which results in clogging of the extruder. On the other hand, when the water content of the raw material is too high, the film is hardly formed. The plasticizer or wetting agent aids to impart the desired plasticity, gloss and other desired qualities to the product. When it is too much, the strength 10 of the product is lowered. The saccharide aids to reduce the setting of the protein solution or paste on standing to improve workability, assure uniform thickness and minimize the surface roughening, thereby contributing to quality maintenance. The fats and oils contribute to improvement in the flavor of the product.

In the process of the present invention, the raw material containing water and protein is kneaded and melted in an extruder with heating at a temperature of the material of 110° to 180° C. preferably 140° to 160° C. and a extruding pressure of 5 to 50 kg/cm$^2$ preferably 10 to 30 kg/cm$^2$. The extrusion temperature from the die is lower than the expansion temperature of water contained in the tubular extrudate in the atmosphere (e.g., not higher than 90° C.).

In addition, an anti-blocking agent (e.g., starch particles having particle size of 5 to 50 μm, preferably 10 to 20 μm which may be in the form of microcapsules with edible fats and oils, etc.) is introduced in the tubular extrudate together with the gas provided into the inside of the extrudate.

The gas to be fed in the tubular extrudate is, for example, air, inert gas such as nitrogen, etc. and the pressure of the gas is higher than atmospheric pressure and, normally, at 0.1 to 1 kg/cm$^2$.

The rate for taking off is higher than the rate for extrusion.

The apparatus for producing the edible proteinaceous film according to the present invention comprises an extruder, a die having a circular opening connected to the front end part of the extruder, a take-off means for taking off a tubular extrudate extruded from the extruder which is provided downstream of the circular opening and apart from the circular opening, and a gas feeder connected to the die. The die has a gas feeding pipe and a gas exhausting pathway at the inside of the circular opening as well as a cooling jacket at the outer periphery of the circular opening. The gas feeding pipe and the cooling jacket are connected to the gas feeder by pipings. Flow rate controllers are provided to the pipings. The gas exhausting pathway has an outflow rate controller and the gas feeding pipe is projected from the end of the circular opening.

An anti-blocking agent feeder is provided to a pipe connecting the gas feeder to the gas feeding pipe of the die.

The die has a cylindrical guide which extends toward downstream at the outer periphery of the circular opening.

For producing the edible proteinaceous film by using the apparatus of the present invention, the raw material containing water and protein is fed to the extruder, and kneaded and melted with heating to form continuous fluidized material at a high temperature. The fluidized material is extruded from the extruder through the circular opening of the die at the extrusion pressure with cooling at the die so that expansion of water contained in the extruding material is prevented to form a continuous tubular extrudate.

The tubular extrudate is solidified by cooling and drying with the atmosphere for its outside surface and the gas for its inside surface, respectively. The solidified extrudate is taken off continuously by the take-off means and transferred to a subsequent step. The tubular extrudate forms a closed space between the circular opening of the die and the holding type take-off means.

The gas blows from the tip of the gas feed pipe into the closed space of the tubular extrudate. Then, the gas flows opposite to the extrusion direction and is exhausted through the gas exhausting pathway of the die. In this stage, the tubular extrudate is stretched in both radial and extrusion directions due to pressure difference between the inside and the outside as well as it is drawn down toward the extrusion direction due to take-off, while it remains in a soft and non-solidified state just after extrusion. Thus, tubular film is formed and it is cooled, dried and solidified downstream of the apparatus.

The gas is expelled from the solidified tubular film by holding with the take-off means and the tubular film is taken off in the form of flat film by the take-off means.

The flow rate and the pressure of the gas fed from the gas feeder to the die are adjusted by the flow rate controllers and the outflow controller provided between connecting pipings to the gas feeding pipe and the gas exhausting pathway of the die according to the stretching ratio and the cooling rate of the tubular extrudate.

The anti-blocking agent such as starch particles or the like, which is fed to the connecting pipe between the gas feeder and gas feeding pipe of the die, is scattered to the inside of the tubular extrudate from the tip of the gas feeding pipe just in front of the take-off means. Thus, as the gas is expelled by the take-off means and the tubular extrudate becomes flat, adhesion between the inside walls of the tubular extrudate is prevented.

In addition, stretching toward the radial direction of the tubular extrudate adjacent to the die opening is controlled by the cylindrical guide to obtain the tubular extrudate having the uniform perimeter. Also, extrudates having different perimeters can be obtained by changing the inner cylinder of the cylindrical guide to that having different perimeter and by adjusting the operation conditions of the extruder and the feeding conditions of the gas.

A preferred embodiment of the process for producing the edible proteinaceous film and the apparatus of the present inventions are illustrated hereinafter in detail with reference to the accompanied drawings.

Figure 2:
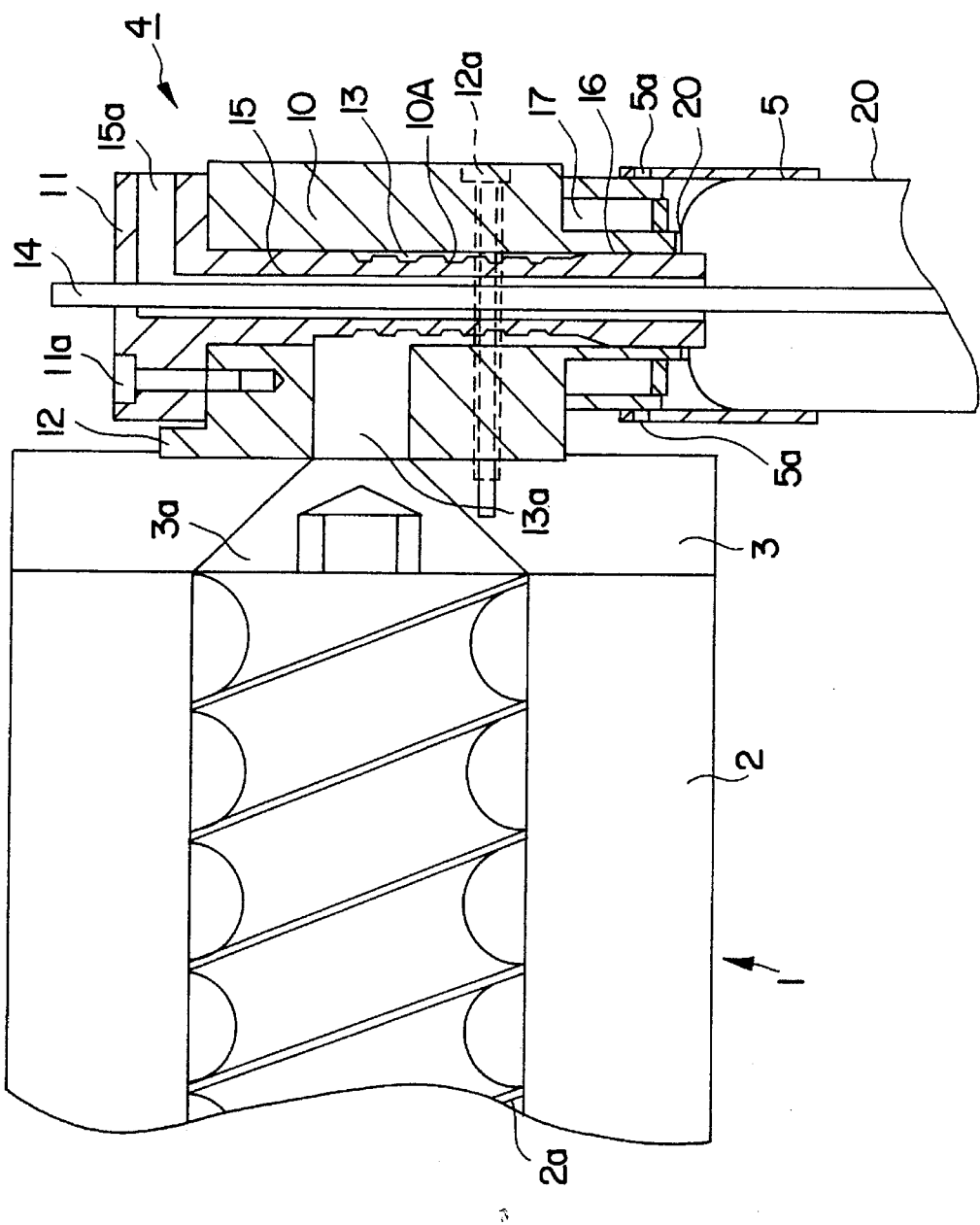
FIG. 2 is a partial enlarged cross section of the main part in FIG. 1.

FIG. 1 is a schematic diagram showing an example of the apparatus for producing the edible proteinaceous film of the present invention including an extruder and circumferential devices. FIG. 2 is a partial enlarged cross section of the main part in FIG. 1 wherein the die is attached to the front end of the barrel of the extruder.

In FIGS. 1 and 2, the extruder 1 is composed of the cylinder (barrel) 2 having the screw 2a and the die holder 3. The die 4 is fixed to the die holder 3. The take-off means 6 is composed of multiple rollers or the like and is provided downstream of the die 4. The winder 7 is provided downstream thereof. The winder 7 takes up the final product, i.e., the edible casing 9.

The die 4 has the construction as shown by FIG. 2. That is, the flange part 12 of the hollow box 10 which constitutes the die 4 is fixed to the die holder 3 by the bolt 12a. The inlet opening 13a of the material pathway 13, which is provided in the hollow box 10 and has T-shaped form, is connected to the outlet opening 3a of the die holder 3. The tubular gas feeding pipe 14 and the cylinder 11 having the gas outflow pathway 15 which contains the gas feeding pipe therein are provided to the material pathway 13.

The cylinder 11 is fixed in the hole 10A of the hollow box 10 by the bolt 11a. In the lower part of the cylinder 11, the circular opening 16 is formed at the lower position of the material pathway 13 of the hollow box 10.

The cooling jacket 17, which introduces gas as a cooling medium, is provided to the lower position of the outer periphery of the hollow box 10. The circular opening 16 is cooled by the cooling jacket 17.

The 1st flow controller 8a and the anti-blocking agent feeder 31 are provided to the piping 32, which connects the gas feeding pipe 14 to the gas feeder 8 which is composed of a pump and the like. The 2nd flow controller 8b is provided to the piping 33 which connects the cooling jacket 17 to the gas feeder 8. The outflow controller 18 is provided to the gas outlet 15a of the gas outflow pathway 15.

For producing the casing by using this apparatus, a melted raw material containing water and protein (not shown) is extruded from the extruder 1 and transferred to the material pathway 13 through the inlet 13a by pressure. The raw material containing water and protein is cooled during the transfer thereof through the material pathway 13 to a temperature at which no expansion occurs by the cooling jacket 17. The tubular extrudate 20 which is extruded downwards from the extruder opening 16 is held by the take-off means 6 composed of two rollers and provided below the die 4. The gas is fed continuously from the gas feeding pipe 14 to the interior of the tubular extrudate 20 by actuation of the gas feeder 8. The gas of higher pressure than the atmospheric pressure is fed into the tubular extrudate 20 after it is extruded from the circular opening 16 but before it is held by take-off means 6. The take-off rate of the tubular extrudate 20 is adjusted so that it is higher than the extrusion rate from the die 4. The gas which has been fed into the extrudate from the gas feeding pipe 14 flows oppositely toward the circular opening 16 of the die 4 in the tubular extrudate 20 and flows out through the gas outflow pathway 15. During this stage, the gas dries the inner surface of the tubular extrudate 20 and is retained therein at the portion between the die 4 and the take-off means 6 to stretch toward three-dimensional directions, while the tubular extrudate 20 is soft and not-solidified state just behind the circular opening 16 (FIGS. 1 and 2 show the state after stretching). In this stage, the stretch ratio is controlled by the amount and pressure of the gas introduced from the gas feeding pipe 14. The anti-blocking agent such as starch particles is fed from the anti-blocking agent feeder 31 into the tubular extrudate 20 through the gas feeding pipe 14 to prevent adhesion of the inner walls of the extrudate.

The edible casing 9 obtained by stretching the tubular extrudate 20 is wound by the winder 7. The edible tubular casing 9 may be converted into sheet or film by cutting it.

The flow rate and the pressure of the gas fed from the gas feeder 8 to the die 4 is controlled according to the stretch ratio and the desired cooling temperature by the flow rate controller 8a fixed to the piping 32 connected to the gas feeding pipe 14 of the die 4 and the outflow controller 18 fixed to the gas outflow pathway 15 of the die 4. The gas flow rate is controlled according to the temperature of the tubular extrudate 20 by the flow rate controller 8b fixed to the piping 33 connected to the cooling jacket 17 of the die 4.

The gas temperature is at about atmospheric temperature and, preferably, the humidity of the gas is lower than that of the atmosphere.

Peripheral stretching of the tubular extrudate 20 which is stretched at about the circular opening outlet 16 of the die 4 is controlled by the tubular guide 5 fixed to the die 4 with the bolt 5a so that the tubular extrudate 20 having uniform perimeter can be obtained. The cylindrical extrudate 20 having different perimeters can be obtained by changing the perimeter of the inner cylinder of the cylindrical guide 5 and controlling the operation conditions of the extruder 1 and the conditions of gas feeding.

The following example further illustrates the present invention. However, it is not to be construed to limit the scope of the present invention.

EXAMPLE

The die 4 was fixed to a biaxial extruder (The Japan Steel Works, Ltd.: TEX-L; outer diameter of the screw: 30 mm; L/D=10). Extrusion was carried out by using a powdered isolated soybean protein "Fujipro R" (crude protein: 90%) (Fuji Oil Co. Ltd.) as the soybean protein. A liquid mixture of 100 parts of the powdered isolated soybean protein, 5 parts of refined soybean oil, 20 parts of wheat starch and 20 parts of D-sorbitol was fed into the cylinder 2 at the flow rate of 0.5 kg/hour and a liquid mixture of 50 parts of glycerol and 100 parts of water was fed into the cylinder 2 at the flow rate of 0.4 kg/hour, respectively. The combined mixture was transferred toward the front part of the cylinder (barrel) 2, while it was kneaded and melted with heating by the screw 2a. The melted material was fed to the inlet 13a through the die holder 3 under pressure. The shape of the screw 2a was a combination of a kneading screw with a reverse screw (not shown) at the heating part. The revolving speed of the screw 2a was 200 r.p.m. and the front part of the cylinder 2 was heated at 160° C. At this time, the temperature of the material at the front part of the cylinder 2 was 155° C. and the extruding pressure was 20 kg/cm$^2$.

The stretching gas and cooling gas were fed by the gas feeder 8 composed of an air pump. The flow rate of the stretching gas was controlled by the 1st flow controller 8a, and the flow rate of the cooling gas was controlled the 2nd flow controller 8b, respectively. The tubular extrudate 20 was stretched at the stretch ratio of 1 to 4-fold with respect to the outer diameter and the thickness of 0.5 mm to 15 μm. Thus, a transparent and yellow-brown edible casing 9 of soybean protein (30–45 μm in thickness) was obtained continuously. At this time, an anti-blocking agent (Toriko 2000: Nikka Ltd.(Tokyo)) was introduced together with the stretching gas into the tubular extrudate 20 to prevent adhesion of inside walls of the casing.

For operating the extruder 1 easily and stably, a clearance of the cylindrical extruding opening at the material pathway 13 of the die 4 is preferably 0.4 to 1 mm. The clearance and the perimeter of the circular opening 16, the flow rate and pressure of gas and the inner perimeter of the cylindrical guide 5 which opens downwards can be varied according to the desired size of the casing 9. Although, in this example, the shape of the outer periphery of the cylinder 11 behind the crossing with the inlet 13a of the die 4 is double spiral grooves, the number of grooves may be 0 to plural.

In the above example, isolated soybean protein was used as the protein in the raw material. Similar results were obtained when one or more proteins selected from a water extract of soybean, a water extract of defatted soybean, a concentrated soybean protein, an isolated soybean 11S protein and a mixture thereof with isolated soybean protein were used as the protein.

As described hereinabove, according to the present invention, for example, the following advantages are obtained.

(1) A cheap and non-porous edible casing is obtained continuously by using soybean protein as a raw material thereof.

(2) The perimeter and thickness of the casing can be controlled by adjusting the flow rate and pressure of the stretching gas.

(3) The soybean protein is stretched three-dimensionally by gas and thereby the resulting casing has excellent tensile strength and flexibility.

What is claimed is:

1. A process for producing an edible proteinaceous film which comprises:

kneading and heating a raw material containing water and protein with an extruder to produce a melted raw material;

extruding the melted raw material through a circular opening provided in a die to produce a tubular extrudate, said die being provided with a cooling jacket at the outer periphery of the circular opening which cools the die to a temperature lower than the temperature at which water in the tubular extrudate expands in the atmosphere;

holding the tubular extrudate with a take-off means composed of rollers provided downstream of and apart from the die to define a closed space inside the tubular extrudate between the die and the take-off means;

providing gas at a pressure above atmospheric pressure to the closed space inside the tubular extrudate, while exhausting the gas therefrom; and receiving the tubular extrudate as it is extruded from the die with the take-off means.

2. A process for producing an edible proteinaceous film according to claim 1, wherein the protein in the raw material is a soybean protein present in an amount of at least 60% by weight of solid matter in the raw material.

3. A process for producing an edible proteinaceous film according to claim 1, wherein the protein in the raw material is one or more proteins selected from the group consisting of a water extract of soybean, a water extract of defatted soybean, a concentrated soybean protein, and an isolated soybean protein.

4. A process for producing an edible proteinaceous film according to claim 1, wherein the raw material comprises 40 to 150% by weight of water, 0 to 100% by weight of a plasticizer or a wetting agent, 0 to 60% by weight of a saccharide and 0 to 60% by weight of fats and oils based on the protein.

5. A process for producing an edible proteinaceous film according to claim 1, wherein the raw material comprises 60 to 100% by weight of water, 40 to 80% by weight of a plasticizer or a wetting agent, 5 to 30% by weight of a saccharide and 5 to 30% by weight of fats and oils based on the protein.

6. A process for producing an edible proteinaceous film according to claim 1, wherein the raw material is kneaded and melted in an extruder with heating at a pressure of 5 to 50 kg/cm$^2$ and at a temperature of 110° to 180° C., and the temperature of the die is lower than the temperature at which water in the tubular extrudate expands in the atmosphere.

7. A process for producing an edible proteinaceous film according to claim 1, wherein an anti-blocking agent is introduced together with gas fed into the tubular extrudate.

8. A process for producing an edible proteinaceous film according to claim 1, wherein the rate at which the tubular extrudate is taken up is faster than the rate at which the tubular extrudate is extruded from the die.

9. A process according to claim 3, wherein the isolated soybean protein is an isolated soybean 11S protein.

* * * * *